United States Patent
O'Regan et al.

(10) Patent No.: US 6,983,822 B2
(45) Date of Patent: Jan. 10, 2006

(54) SOUND ABSORPTIVE PROTECTIVE MAT

(75) Inventors: Desmond O'Regan, N. Ireland (GB); James H. Fisher, Manchester, IN (US); Hameed S. Khan, Crown Point, IN (US); Burton J. Price, Bloomsburg, PA (US)

(73) Assignee: Rieter Technologies AG, Winterthur (CH)

( * ) Notice: Subject to any disclaimer, the term of this patent is extended or adjusted under 35 U.S.C. 154(b) by 0 days.

(21) Appl. No.: 10/478,255

(22) PCT Filed: May 21, 2002

(86) PCT No.: PCT/CH02/00271

§ 371 (c)(1),
(2), (4) Date: Nov. 19, 2003

(87) PCT Pub. No.: WO02/094616

PCT Pub. Date: Nov. 28, 2002

(65) Prior Publication Data

US 2005/0016793 A1    Jan. 27, 2005

Related U.S. Application Data

(60) Provisional application No. 60/292,345, filed on May 22, 2001.

(51) Int. Cl.
*E04B 2/02* (2006.01)
*E04B 1/82* (2006.01)
*G10K 11/16* (2006.01)
*B62D 25/20* (2006.01)

(52) U.S. Cl. .................... 181/290; 181/286; 181/210; 181/204; 296/39.3; 180/69.22

(58) Field of Classification Search ............... 181/290, 181/286, 294, 210, 204; 296/39.3, 39.1; 180/69.22, 69.23
See application file for complete search history.

(56) References Cited

U.S. PATENT DOCUMENTS

| | | | | |
|---|---|---|---|---|
| 4,579,764 A | * | 4/1986 | Peoples et al. | 428/95 |
| 5,186,996 A | * | 2/1993 | Alts | 181/290 |
| 5,493,081 A | * | 2/1996 | Manigold | 181/286 |
| 5,554,830 A | * | 9/1996 | Muller et al. | 181/290 |
| 5,677,027 A | * | 10/1997 | Masuda et al. | 428/96 |
| RE36,323 E | * | 10/1999 | Thompson et al. | 181/286 |

(Continued)

FOREIGN PATENT DOCUMENTS

| EP | 1428656 A1 | * | 6/2004 |
|---|---|---|---|
| WO | WO 98/18656 | * | 5/1998 |
| WO | WO 98/18657 | * | 5/1998 |

(Continued)

*Primary Examiner*—Edgardo San Martin
(74) *Attorney, Agent, or Firm*—Nath & Associates PLLC; Gary M. Nath; Gregory B. Kang

(57) ABSTRACT

The present invention concerns an automotive protective mat (1), also known as throw in mat or protective mat. This mat comprises a microporous stiffening layer (2) (acoustical membrane). This layer may be composed of several sheets. The overall air flow resistance is between 500 Ns/m³–4000 Ns/m³. It is essential for this mat (1) that it is hydrophobic. In order to achieve an enhanced acoustical effectiveness a decoupling layer (6) is foreseen between the microporous stiffening layer (2) and the vehicle floor (8). This decoupling layer might be incorporated in the mat (1) or constituted by the underlaying carpet or sound absorber of the vehicle floor. Further layers or sheets such as adhesive layers, non skid layers, face fabrics or carpets and/or loft layers can be added to the claimed mat.

18 Claims, 1 Drawing Sheet

U.S. PATENT DOCUMENTS

| | | | | |
|---|---|---|---|---|
| 6,145,617 | A | 11/2000 | Alts | 181/290 |
| 6,296,075 | B1 * | 10/2001 | Gish et al. | 181/290 |
| 6,631,785 | B2 * | 10/2003 | Khambete et al. | 181/290 |
| 2003/0003267 | A1 | 1/2003 | Alts | 428/116 |

FOREIGN PATENT DOCUMENTS

| | | |
|---|---|---|
| WO | WO 00 27671 A | 5/2000 |
| WO | WO 01 40025 | 6/2001 |
| WO | WO 01/58722 A | 8/2001 |

* cited by examiner

SOUND ABSORPTIVE PROTECTIVE MAT

This application claims the benefit of Provisional Application No. 60/292,345, filed May 22, 2001.

FIELD OF THE INVENTION

The present invention relates to a sound absorptive protective mat for the noise reduction in vehicles and relates to a combination of this sound absorptive protective mat with a conventional floor mat, in particular with a multi-layered assembly package in accordance with U.S. Pat. No. 6,145,617, comprising a microporous stiffening layer.

BACKGROUND OF THE INVENTION

Automotive protective mats are usually placed over the fitted carpeting in motor vehicles and currently serve only to protect the carpeting under the driver's and passengers' feet. They generally are not significantly sound absorbent. These known mats may even increase the noise levels in the automobile, if they comprise a sound insulating layer which reflects the interior noise or if they are in resonance with the underlying flooring. The acoustically enhanced protective mats described below reduce the sound levels in a vehicle significantly. The mats described can be made lighter than currently produced protective mats, thereby reducing the vehicle weight. The protective mat according to the invention can also be used in residential and commercial structures to reduce the echoing in rooms with hard floors.

Existing automotive protective mats are well known in the art. Most of them consist of carpets having a fairly heavy backing layer and show poor sound absorptive properties which are commonly compensated by an undesirable increased thickness of the backing layer.

SUMMARY OF THE INVENTION

It is therefore the object of the present invention to provide a thin and lightweight protective mat having superior acoustical properties.

In particular, it is the object of the present invention to provide a protective mat to be used with conventional spring-mass flooring systems (showing a sound insulation loss in the range of resonance frequencies) or with conventional sound absorptive carpets (without sound insulation loss in the range of resonance frequencies), known from U.S. Pat. No. 6,145,617.

This object is achieved by a protective mat with reference to the teaching of U.S. Pat. No. 6,145,617. This patent discloses an ultra-light, multifunctional sound-insulating kit for reducing noise in motor vehicles. This kit comprises a microporous reinforcing layer comprising an air flow resistance between $R_f=500$ Ns/m$^3$ and $R_f=2500$ Ns/m$^3$, an areal-mass of $m_F=0.3$ kg/m$^2$ to $m_F=2.0$ kg m$^2$ and a bending stiffness of B=0.05 Nm to B=10.5 Nm. This assembly package permits to replace classic spring-mass-systems for noise reduction in vehicles and permits to reduce the weight of these classic spring-mass-systems by at least 50%. This kit does not behave like a conventional spring-mass system and does not show a sound insulation loss in the range of resonance frequencies. The content and teaching of U.S. Pat. No. 6,145,617 is incorporated herein by way of reference.

The present invention aims to create a light weight floor mat to be placed over the fitted carpeting and having an enhanced acoustical effectiveness compared to known protective mats. The mentioned aims are achieved by a protective mat comprising a low air flow resistance and water impermeable layer to be put on the vehicle floor, in particular to be put on fitted carpeting, preferably a carpeting with a high loft layer in accordance with U.S. Pat. No. 6,145,617. On top of this loft layer there is fixed a face fabric or carpet (if needed) by means of at least one adhesive layer (if needed). In addition, the present mat comprises at least one hydrophobic layer which can at the same time be an open cell layer to create a well defined air flow resistance.

The protective mat according to the invention is a further development of the multilayer assembly as disclosed in U.S. Pat. No. 6,145,617. It is essential for the invention that a decoupling layer is provided between the protective mat and the vehicle carpeting or flooring. The decoupling layer can be incorporated in the mat or consists of a top layer of the vehicle carpeting.

This invention and further preferred embodiments will be described with the aid of the Figures.

DETAILED DESCRIPTION OF THE PREFERRED EMBODIMENTS

Figure 1:
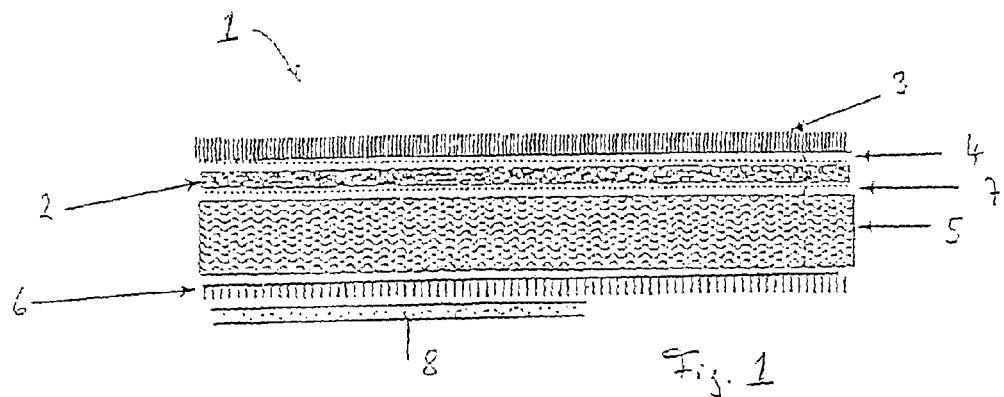
FIG. 1 shows a sectional view of a preferred embodiment of a mat according to the invention.

FIG. 1 shows a sectional view of a preferred embodiment of the sound absorptive protective mat 1 incorporating a decoupler 6 and comprising a hydrophobic and air flow resistant layer 2. This hydrophobic and air flow resistant layer 2 carries optionally a face fabric or carpet 3, which both are permeable to air, and are preferably bonded by an adhesive layer 4; the face fabric or carpet 3 can also be mechanically fixed to the hydrophobic and air flow resistant layer 2. The hydrophobic and air flow resistant layer 2 can be fibrous or made of TPE (elastomer), rubber or vinyl. Underneath this hydrophobic and air flow resistant layer 2 there is foreseen a high loft, low air flow resistance layer 5, comprising at its bottom an additional non-skid barrier layer functioning as a decoupler 6. This high loft, low air flow resistant layer 5 is preferably attached to the hydrophobic and air flow resistant layer 2 with the aid of a second adhesive layer 7.

The combination of the face fabric 3, the adhesive layers 4 and 7, and the hydrophobic air flow resistant layer 2 has a total air flow resistance of 500 Ns/m$^3$ –4000 Ns/M$^3$. The hydrophobic layer 2 is able to repel sufficient moisture to protect the mat's internal structure and the underlying carpet. Water resistance can also be achieved by an adhesive layer, in particular by a DOW 936, 0.0015" adhesive film. The repellent value averages 150 mm, in particular the layer shows no water leakage for 150 ml per 6 hours or even 750 ml per 16 hours. The air flow resistant layer 2 is preferably made of tightly packed fibrous materials in order to achieve a high bending stiffness. The stiffness is preferably in the range of 0.05–10.5 Nm and is made of an open-pored moulded rubber or an air permeable thermoplastic elastomer.

The high loft layer 5 is preferably made of a lofty fibrous layer comprising 3-denier fibres, but can also be made of open cell foam. The thickness of this layer 5 determines the mat's effectiveness to absorb low frequency sound. When this high loft layer is made of polyurethane foam or similar material, this layer functions also as a non-skid layer. If the high loft layer 5 does not provide acceptable non-skid and/or barrier properties, then an additional non-skid barrier layer or other mechanical restraints may be provided.

Figure 2:
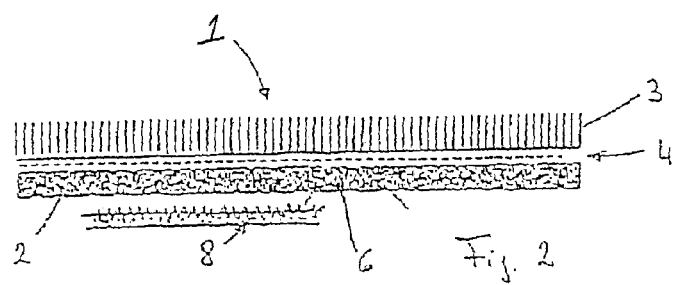
FIG. 2 shows a sectional view of second embodiment of a mat according to the invention.

FIG. 2 shows a mat in accordance with the present invention including an acoustical membrane only for interacting with an underlying carpet and sound absorber comprising a decor layer functioning as a decoupler 6. This mat 1 comprises a stiff hydrophobic and air flow resistant layer 2 and optionally a face fabric or carpet 3. This face fabric or carpet 3 is bonded to the hydrophobic and air flow resistant layer 2 by means of an air permeable, adhesive layer 4. This embodiment reduces the invention to the minimum structure. The protective layer 2 consists of a tightly packed fibre layer, or a microporous rubber, TPE, vinyl or similar. The face fabric and adhesive layer are optional. The air flow resistance of this assembly should be between 500 Ns/m$^3$–4000 Ns/m$^3$, preferably between 500 Ns/m$^3$ and 2000 Ns/m$^3$. When mounted, the underlying carpet and/or absorber (for instance according to U.S. Pat. No. 6,145,617,) functions as the decoupler layer for this assembly. Mechanical restraints of this mat may be necessary, depending upon the materials used and the customers' requirements.

The following tables show the acoustical improvement of the mat according to the present invention in comparison to classical mats with a closed surface. These calculations are based on the following configurations:

Table 1:
  values of a simple light weight carpet (in the following called "RUL carpet") in accordance with U.S. Pat. No. 6,145,617 having the following structure:
  0.8 mm steel
  3.5 kg/m$^2$ bitumen damping
  0.2 mm air gap
  25 mm foam
  0.7 kg/m$^2$ air flow resistant layer with AFR=1500 Ns/m$^3$
  4 mm carpet are compared with an assembly of such an RUL carpet with the addition of a protective mat according to the invention, which RUL carpet comprises:
  0.8 mm steel
  3.5 kg/m$^2$ bitumen damping
  0.2 mm air gap
  10 mm foam
  0.7 kg/m$^2$ air flow resistant layer with AFR=1500 Ns/m$^3$
  4 mm carpet, generating a 0.2 mm air gap and which protective mat comprises the following structure:
  15 mm foam, 0.7 kg/m$^2$, 1500 Ns/m$^3$
  4 mm carpet

TABLE 1

| | (1) Simple RUL 25 mm foam, 0.7 kg/m$^2$, 1500 Ns/m$^3$ | | | (2) RUL 10 mm foam, +protective mat 15 mm foam, each 0.7 kg/m$^2$, 1500 Ns/m$^3$ | | |
|---|---|---|---|---|---|---|
| Frequency (Hz) | TL (dB) | α (1) | NR (dB) | TL (dB) | α (1) | NR (dB) |
| 60 | 16.0 | 0.16 | 8.0 | 16.5 | 0.15 | 8.3 |
| 100 | 19.5 | 0.13 | 10.6 | 20.0 | 0.13 | 11.1 |
| 160 | 23.5 | 9.17 | 15.8 | 23.0 | 0.20 | 16.0 |
| 200 | 24.5 | 0.26 | 18.6 | 24.0 | 0.33 | 19.2 |
| 400 | 33.0 | 0.66 | 31.2 | 35.0 | 0.74 | 33.7 |
| 800 | 46.5 | 0.76 | 45.3 | 48.5 | 0.73 | 47.1 |
| 1000 | 50.0 | 0.76 | 48.8 | 50.0 | 0.73 | 48.6 |
| 2000 | 50.0 | 0.76 | 48.8 | 50.0 | 0.76 | 48.8 |
| 3000 | 50.0 | 0.76 | 48.8 | 50.0 | 0.77 | 48.9 |
| 4000 | 50.0 | 0.77 | 48.9 | 50.0 | 0.77 | 48.9 |
| 5000 | 50.0 | 0.77 | 48.9 | 50.0 | 0.78 | 48.9 |
| 8000 | 50.0 | 0.76 | 48.8 | 50.0 | 0.77 | 48.9 |

Table 2:

values of a conventional RUL carpet carrying a protective mat according to the invention and having the following structure:
  0.8 mm steel
  3.5 kg/m$^2$ bitumen damping
  0.2 mm air gap
  20 mm foam
  0.7 kg/m$^2$, 1500 Ns/m$^3$ AFR layer
  4 mm carpet, generating a 0.2 mm air gap and
  5 mm foam
  0.7 kg/m$^2$, 1500 Ns/m$^3$ AFR layer
  4 mm carpet are compared with a combination of a conventional RUL carpet carrying a classical mat having the following structure:
  0.8 mm steel
  3.5 kg/m$^2$ bitumen damping
  0.2 mm air gap
  20 mm foam
  0.7 kg/m$^2$, 1500 Ns/m$^3$ AFR layer
  4 mm carpet, generating a 0.2 mm air gap and
  5 mm foam
  0.5 kg/m$^2$ resp. 4.0 kg/m$^2$ heavy layer
  4 mm carpet

TABLE 2

| | RUL 20 mm Foam 0.7 kg/m$^2$, 1500 Ns/m$^3$ +Option Mat | | | 5 mm Foam 0.5 kg/m$^2$, 96000 Ns/m$^3$ +Classical Mat | | | RUL 20 mm Foam 0.7 kg/m$^2$, 1500 Ns/m$^3$ +Option Mat | | | 5 mm Foam 4.0 kg/m$^2$, 96000 Ns/m$^3$ +Classical Mat | | |
|---|---|---|---|---|---|---|---|---|---|---|---|---|
| Frequency (Hz) | TL (dB) | α (1) | NR (dB) | TL (dB) | α (1) | NR (dB) | TL (dB) | α (1) | NR (dB) | TL (dB) | α (1) | NR (dB) |
| 60 | 16.5 | 0.15 | 08.3 | 16.5 | 0.16 | 08.5 | 17.0 | 0.15 | 8.8 | 17.5 | 0.12 | 08.3 |
| 100 | 20.0 | 0.14 | 11.5 | 19.5 | 0.14 | 11.0 | 20.0 | 0.14 | 11.5 | 19.0 | 0.14 | 10.5 |
| 160 | 23.0 | 0.20 | 16.0 | 22.0 | 0.20 | 15.0 | 24.0 | 0.26 | 18.1 | 16.0 | 0.60 | 13.8 |
| 200 | 24.0 | 0.34 | 19.3 | 23.0 | 0.32 | 18.1 | 26.5 | 0.38 | 22.3 | 22.0 | 0.50 | 19.0 |
| 400 | 35.0 | 0.74 | 33.7 | 31.0 | 0.78 | 29.9 | 37.0 | 0.60 | 34.8 | 46.0 | 0.14 | 37.5 |

TABLE 2-continued

| | RUL 20 mm Foam 0.7 kg/m², 1500 Ns/m³ +Option Mat | | | 5 mm Foam 0.5 kg/m², 96000 Ns/m³ +Classical Mat | | | RUL 20 mm Foam 0.7 kg/m², 1500 Ns/m³ +Option Mat | | | 5 mm Foam 4.0 kg/m², 96000 Ns/m³ +Classical Mat | | |
|---|---|---|---|---|---|---|---|---|---|---|---|---|
| Frequency (Hz) | TL (dB) | α (1) | NR (dB) | TL (dB) | α (1) | NR (dB) | TL (dB) | α (1) | NR (dB) | TL (dB) | α (1) | NR (dB) |
| 800  | 50.0 | 0.70 | 48.5 | 50.0 | 0.34 | 45.3 | 49.5 | 0.64 | 47.6 | 50.0 | 0.18 | 42.6 |
| 1000 | 50.0 | 0.70 | 48.5 | 50.0 | 0.30 | 44.8 | 50.0 | 0.65 | 48.1 | 50.0 | 0.21 | 43.2 |
| 2000 | 50.0 | 0.74 | 48.7 | 50.0 | 0.36 | 45.6 | 50.0 | 0.72 | 48.6 | 50.0 | 0.27 | 44.3 |
| 3000 | 50.0 | 0.77 | 48.9 | 50.0 | 0.38 | 45.8 | 50.0 | 0.76 | 48.8 | 50.0 | 0.32 | 45.1 |
| 4000 | 50.0 | 0.78 | 48.9 | 50.0 | 0.38 | 45.8 | 50.0 | 0.77 | 48.9 | 50.0 | 0.35 | 45.4 |
| 5000 | 50.0 | 0.78 | 48.9 | 50.0 | 0.39 | 45.9 | 50.0 | 0.77 | 48.9 | 50.0 | 0.37 | 45.7 |
| 8000 | 50.0 | 0.78 | 48.9 | 50.0 | 0.42 | 46.2 | 50.0 | 0.77 | 48.9 | 50.0 | 0.40 | 46.0 |

For these configurations the transmission loss (TL) and the absorption coefficient (α) have been calculated with a program called SISAB for diffuse sound incidence. Noise reduction (NR) has been obtained using the formula $$NR = 10 * \log(\alpha) + TL$$

which is valid within a space with diffuse sound fields.

From these tables it becomes apparent that the combination in accordance with the present invention results in significantly better acoustical performance (insertion loss and absorption) with substantial weight reduction of the whole system as compared to classical (mass-backed, i.e. spring-mass) systems.

In-vehicle analysis shows that the protective mats according to the invention the interior sound pressure levels and, more specifically, increase the on index values by 1%–2% for both powertrain noise and tire/road noise Furthermore, the combination in accordance with the invention leads to a reduction of 27%.

Further preferred embodiments, as described below, have an overall thickness of 13 mm.

Such a first preferred embodiment consists of a 3 lb/ft³ and 6 mm thick PUR-foam adhered to a 4 mm thick polyester needled felt having a weight of 750 gr/m². The polyester felt comprises bicomponent melt fibres to achieve the required air flow resistance. The felt is treated with a water repellent to prevent moisture from penetrating. A carpet is adhered to the top of this hydrophobic and air flow resistant felt.

Such a second embodiment comprises 40 g/m² melt-blown polypropylene fibres to achieve the desired air flow resistance. The foam thickness is increased to 9.5 mm to make up a 13 mm overall thickness.

Both embodiments show similar advantageous acoustic properties.

Figure 3:
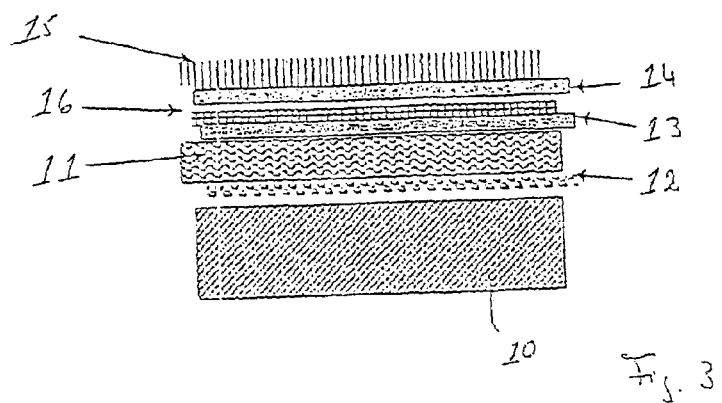
FIG. 3 shows a sectional view of an enhanced third embodiment of a mat according to the invention.

FIG. 3 shows a further developed embodiment of the present invention comprising the following structure from the bottom to the top:
- a loft layer 10. This loft layer can be a die cut needled felt, a die cut thermoplastic felt, a die cut non-hexa resinated felt, a molded thermoplastic felt, a cast foam or a die cut slab foam;
- a PET felt 11 with fluorocarbon treatment which is bonded to the loft layer 10 by means of a spray hot melt 12;
- an adhesive film 13 carrying a PET secondary scrim 16;
- a PE pre-coat 14 carrying a carpet 15 with a PET primary backing.

This structure allows to form the entire mat in a single-step process and may be manufactured with standard carpet molding equipment. Furthermore, with this assembly it is possible to avoid the use of phenolic resin. In order to improve the water resistance of this structure the hydrophobic and air flow resistant felt is treated with a fluorocarbon-based water repellent.

In summary, the present invention concerns an automotive protective mat 1, also known as throw-in mat or protective mat, interacting with a conventional flooring system. This mat 1 comprises a microporous stiffening layer 2 (acoustical membrane). This layer 2 may be composed of several sheets. The overall air flow resistance is between 500 Ns/m³–4000 Ns/m³, preferably between 500 Ns/m³–2000 Ns/m³. It is essential for this mat 1 that it is hydrophobic. In order to achieve an enhanced acoustical effectiveness a decoupling layer 6 is foreseen between the microporous stiffening layer 2 of the mat and the vehicle flooring 8. This decoupling layer 6 might be incorporated in the mat 1 or constituted by the underlaying carpet or sound absorber of the vehicle floor. Further layers or sheets such as adhesive layers, non-skid layers, face fabrics or carpets and/or loft layers can be added to the claimed mat.

The advantages of the claimed sound absorptive protective mat are apparent for the man skilled in the art and are to be seen in particular in the enhanced acoustical properties and the weight reduction of whole flooring system.

What is claimed is:

1. Sound absorptive protective mat for use with a conventional motor vehicle flooring, in particular a multilayered assembly package comprising
   a microporous stiffening layer, which protective mat comprises
   a hydrophobic and air flow resistant layer having a total air flow resistance of 500 Ns/m³ to 4000 Ns/m³,
   whereby, in the assembled state of the protective mat, with a motor vehicle flooring interacting means functioning as a decoupler, an air gap is generated between the protective mat and the motor vehicle flooring.

2. Sound absorptive protective mat according to claim 1 wherein the air flow resistant layer is a microporous layer with a bending stiffness of B=0.05 Nm to B=10.5 Nm.

3. Sound absorptive protective mat according to claim 1, wherein the protective mat comprises a decoupler as interacting means.

4. Sound absorptive protective mat according to claim 2, further comprising a loft layer selected from the group consisting of a diecut needled felt, a diecut thermoplastic felt, a diecut non-hexa resinated felt, a molded thermoplastic felt, a cast foam, and a diecut slab foam.

5. Sound absorptive protective mat according to claim 4, wherein the layers are bonded to each other by an air permeable adhesive layer.

6. Sound absorptive protective mat in combination with a conventional motor vehicle flooring, in particular a multi-layered assembly package comprising
- a microporous stiffening layer, which protective mat comprises
- a hydrophobic and air flow resistant layer having a total air flow resistance of 500 Ns/m$^3$ to 4000 Ns/m$^3$,
- whereby interacting means functioning as a decoupler generating an air gap are provided between the protective mat and the flooring.

7. Sound absorptive protective mat according to claim 6 wherein the air flow resistant layer is a microporous layer with a bending stiffness of B=0.05 Nm to B=10.5 Nm.

8. Sound absorptive protective mat according to claim 7, further comprising a face fabric or carpet.

9. Sound absorptive protective mat according to claim 7, further comprising a loft layer selected from the group consisting of a diecut needled felt, a diecut thermoplastic felt, a diecut non-hexa resinated felt, a molded thermoplastic felt, a cast foam, and a diecut slab foam.

10. Sound absorptive protective mat according to claim 9, wherein the layers are bonded to each other by an air permeable adhesive layer.

11. Sound absorptive protective mat according to claim 3, wherein the layers are bonded to each other by an air permeable adhesive layer.

12. Sound absorptive protective mat according to claim 2, wherein the layers are bonded to each other by an air permeable adhesive layer.

13. Sound absorptive protective mat according to claim 1, wherein the layers are bonded to each other by an air permeable adhesive layer.

14. Sound absorptive protective mat according to claim 8, wherein the layers are bonded to each other by an air permeable adhesive layer.

15. Sound absorptive protective mat according to claim 7, wherein the layers are bonded to each other by an air permeable adhesive layer.

16. Sound absorptive protective mat according to claim 6, wherein the layers are bonded to each other by an air permeable adhesive layer.

17. Sound absorptive protective mat according to claim 1, wherein the hydrophobic and air flow resistant layer has a total air flow resistance of between 500 Ns/m$^3$ to 2000 Ns/m$^3$.

18. Sound absorptive protective mat according to claim 6, wherein the hydrophobic and air flow resistant layer has a total air flow resistance of between 500 Ns/m$^3$ to 2000 Ns/m$^3$.

* * * * *